(12) United States Patent
Sedano et al.

(10) Patent No.: US 10,784,797 B1
(45) Date of Patent: Sep. 22, 2020

(54) BOOTSTRAP CHARGING BY PWM CONTROL

(71) Applicant: Rockwell Automation Technologies, Inc., Mayfield Heights, OH (US)

(72) Inventors: Willy E. Sedano, Milwaukee, WI (US); Peizhong Yi, Milwaukee, WI (US); Brian P. Brown, Milwaukee, WI (US); Lixiang Wei, Milwaukee, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 16/445,529

(22) Filed: Jun. 19, 2019

(51) Int. Cl.
*H02M 7/538* (2007.01)
*H02M 7/5387* (2007.01)
*H02M 1/084* (2006.01)

(52) U.S. Cl.
CPC ....... *H02M 7/53871* (2013.01); *H02M 1/084* (2013.01); *H02M 7/53875* (2013.01); *H02M 7/53873* (2013.01); *H02M 2007/53876* (2013.01)

(58) Field of Classification Search
CPC ......... H02M 7/53871; H02M 7/53873; H02M 7/53875; H02M 2007/53876; H02M 1/084
See application file for complete search history.

(56) References Cited

U.S. PATENT DOCUMENTS

| | | | |
|---|---|---|---|
| 5,623,219 A | 4/1997 | Karraker | |
| 5,936,856 A | 8/1999 | Xiang | |
| 6,023,417 A | 2/2000 | Hava et al. | |
| 6,185,115 B1 | 2/2001 | Sul et al. | |
| 6,233,396 B1 | 5/2001 | Kuwada et al. | |
| 6,246,296 B1 | 6/2001 | Smith | |
| 6,617,819 B2 | 9/2003 | Dohmae et al. | |
| 6,710,564 B2 | 3/2004 | Shibuya et al. | |
| 7,034,501 B1 | 4/2006 | Thunes et al. | |
| 7,102,327 B2 | 9/2006 | Ho | |
| 7,141,943 B2 | 11/2006 | Song et al. | |
| 7,187,155 B2 | 3/2007 | Matsuo et al. | |

(Continued)

OTHER PUBLICATIONS

Hava, et al., "A High Performance Generalized Discontinuous PWM Algorithm", IEEE Applied Power Electronics Conference, Feb. 1997, vol. 2, pp. 886-891, IEEE Trans. on Industry Applications Version.

(Continued)

*Primary Examiner* — Fred E Finch, III
*Assistant Examiner* — Rafael O De Leon Domenech
(74) *Attorney, Agent, or Firm* — Fay Sharpe LLP

(57) ABSTRACT

A power conversion system includes a controller that generates switching control signals according to duty cycles for a current switching control cycle, and adjusts the duty cycles by a non-zero offset value according to a modulation index in response to the modulation index exceeding a non-zero threshold. A method includes computing first duty cycles according to a modulation index, generating a plurality of switching control signals according to the first duty cycles in response to the modulation index being less than or equal to a non-zero threshold, computing second duty cycles offset from the first duty cycles and generating the plurality of switching control signals according to the second duty cycles in response to the modulation index exceeding the non-zero threshold.

20 Claims, 13 Drawing Sheets

(56) References Cited

U.S. PATENT DOCUMENTS

| | | |
|---|---|---|
| 7,190,599 B2 | 3/2007 | Virolainen et al. |
| 7,265,954 B2 | 9/2007 | Hikawa et al. |
| 7,400,518 B2 | 7/2008 | Yin et al. |
| 7,495,938 B2 | 2/2009 | Wu et al. |
| 7,629,764 B2 | 12/2009 | Shoemaker et al. |
| 7,649,756 B2 | 1/2010 | Kerkman et al. |
| 7,679,310 B2 | 3/2010 | Schulz et al. |
| 7,738,267 B1 | 6/2010 | Tallam et al. |
| 7,759,897 B2 | 7/2010 | Piippo |
| 7,825,621 B2 | 11/2010 | Wei et al. |
| 7,881,081 B1 | 2/2011 | Tallam et al. |
| 8,054,032 B2 | 11/2011 | Chakrabarti et al. |
| 8,107,267 B2 | 1/2012 | Tallam et al. |
| 9,318,976 B1* | 4/2016 | Wei ............... H02M 7/537 |
| 9,658,632 B2 | 5/2017 | Wright |
| 2004/0195995 A1 | 10/2004 | Quirion et al. |
| 2006/0067092 A1 | 3/2006 | Nondahl et al. |
| 2007/0268728 A1 | 11/2007 | Mohan et al. |
| 2010/0165674 A1 | 7/2010 | Dai et al. |
| 2010/0172161 A1 | 7/2010 | Tallam et al. |
| 2011/0012544 A1 | 1/2011 | Schulz et al. |
| 2011/0299308 A1 | 12/2011 | Cheng et al. |
| 2012/0075892 A1 | 3/2012 | Tallam et al. |
| 2012/0112674 A1 | 5/2012 | Schulz et al. |
| 2012/0140532 A1 | 6/2012 | Tallam et al. |
| 2012/0201056 A1 | 8/2012 | Wei et al. |
| 2012/0212982 A1* | 8/2012 | Wei ............... H02M 5/4585 363/37 |
| 2013/0119965 A1 | 5/2013 | Marvin et al. |
| 2014/0042817 A1* | 2/2014 | Zargari ............... H02M 1/32 307/72 |
| 2014/0265596 A1* | 9/2014 | Yuan ............... H02J 3/386 307/69 |
| 2014/0268953 A1* | 9/2014 | Patel ............... H02M 1/4225 363/89 |
| 2014/0268954 A1* | 9/2014 | Wei ............... H02M 7/217 363/89 |
| 2014/0297131 A1 | 10/2014 | Kashima |
| 2015/0077025 A1 | 3/2015 | Suzuki |
| 2015/0145462 A1* | 5/2015 | Ulrich ............... H02M 3/1584 318/503 |
| 2015/0180382 A1 | 6/2015 | Hamada et al. |
| 2016/0006367 A1* | 1/2016 | Wei ............... H02M 7/53875 363/131 |
| 2016/0126861 A1* | 5/2016 | Wei ............... H03K 3/017 363/97 |
| 2016/0254760 A1* | 9/2016 | Zhang ............... H02M 7/48 363/95 |
| 2018/0175627 A1* | 6/2018 | Woodburn ............... H02J 3/00 |

OTHER PUBLICATIONS

Sutar et al., "Performance Analysis of Z-Source Inverter Fed Induction Motor Drive", Int'l Journal of Scientific & Engineering Research, vol. 3, Issue 5, May 2012, pp. 1-6.

Yoo et al., "Third Harmonic Injection Circuit to Eliminate Electrolytic Capacitors in Light-Emitting Diode Drivers", Journal of Electrical Engineering & Technology, vol. 7, No. 3, pp. 358-365, 2012.

Younis et al., "High Efficiency THIPWM Three-Phase Inverter for Grid Connected System", 2010 IEEE Symposium on Industrial Electronics and Applications (ISIEA 2010), Oct. 3-5, 2010, Penang, Malaysia, pp. 88-93.

Younis et al., "Simulation of Grid Connected THIPWM-Three-Phase Inverter Using SINIULINK", 2011 IEEE Symposium on Industrial Electronics and Applications (ISIEA2011), Sep. 25-28, 2011, Langkawi, Malaysia, pp. 133-137.

Jiang et al., "Variable Switching Frequency PWM for Three-Phase Converter for Loss and EMI Improvement", Conference Record of APEC, Oct. 2012, pp. 1576-1583.

Shihong Park and T.M Jahns, A self-boost charge pump topology for a gate drive high-side power supply. IEEE Transactions on Power Electronics, 202):300-307, Mar. 2005.

Y. Lee and J. Kim, "A Novel Enhanced Inverted PWM Driving Scheme for Three-Phase BLDC Motor Drive," In 2018 IEEE International Conference on Consumer Electronics—Asia (ICCE—Asia), pp. 206-212, Jun. 2018.

J. Jung, H. Ku, W. Kim, and J. Kim, "A PWM control strategy for low-speed operation of three-level NPC inverter based on bootstrap gate drive circuit," In 2014 IEEE Applied Power Electronics Conference and Exposition—APEC 2014, pp. 297-302, Mar. 2014.

International Rectifier, Appl. Note AN-1123, pp. 2-12.

Texas Instruments, Appl. Note SLUA887, pp. 1-3.

* cited by examiner

| 142 ⟶ | | |
|---|---|---|
| LUT | | |
| dx | FREQUENCY (Hz) | DC BUS USAGE % |
| -0.986 | 200 | 93.1 |
| -0.985 | 300 | 93.3 |
| -0.983 | 400 | 93.5 |
| -0.982 | 500 | 93.4 |
| -0.980 | 600 | 93.3 |
| -0.971 | 700 | 93.2 |
| -0.961 | 800 | 93.0 |
| -0.952 | 900 | 93.0 |
| -0.943 | 1000 | 93.1 |
| -0.933 | 2000 | 93.1 |
| -0.924 | 3000 | 91.7 |
| -0.915 | 4000 | 90.2 |
| -0.905 | 5000 | 90.1 |
| -0.896 | 6000 | 90.0 |
| -0.887 | 7000 | 89.2 |
| -0.877 | 8000 | 88.5 |
| -0.868 | 9000 | 88.2 |
| -0.859 | 10000 | 87.9 |
| -0.849 | 1100 | 87.6 |
| -0.840 | 1200 | 87.3 |

FIG. 7

BOOTSTRAP CHARGING BY PWM CONTROL

BACKGROUND INFORMATION

The disclosed subject matter relates to power conversion systems.

BRIEF DESCRIPTION

Various aspects of the present disclosure are now summarized to facilitate a basic understanding of the disclosure, wherein this summary is not an extensive overview of the disclosure and is intended neither to identify certain elements of the disclosure, nor to delineate the scope thereof. Rather, the primary purpose of this summary is to present the concept of the disclosure in a simplified form prior to the more detailed description that is presented hereinafter.

A power conversion system includes a controller that generates switching control signals according to duty cycles for a current switching control cycle, and adjusts the duty cycles by a non-zero offset value according to a modulation index in response to the modulation index exceeding a non-zero threshold.

A method includes computing first duty cycles according to a modulation index, generating a plurality of switching control signals according to the first duty cycles in response to the modulation index being less than or equal to a threshold, computing second duty cycles offset from the first duty cycles and generating the plurality of switching control signals according to the second duty cycles in response to the modulation index exceeding the threshold.

A non-transitory computer readable medium includes program instructions which, when executed by a processor cause the processor to compute a plurality of first duty cycles according to a modulation index for a current switching control cycle of a power conversion system, each first duty cycle corresponding to a respective one of a plurality of AC nodes of the power conversion system, and, in response to the modulation index being less than or equal to a non-zero threshold, to generate a plurality of switching control signals according to the first duty cycles for the current switching control cycle. The computer readable medium includes program instructions which, when executed by a processor cause the processor to in response to the modulation index exceeding the non-zero threshold, compute a plurality of second duty cycles by adding a non-zero offset value to the first duty cycles, each second duty cycle corresponding to a respective one of the plurality of AC nodes, and, in response to the modulation index exceeding the non-zero threshold, generate the plurality of switching control signals according to the second duty cycles for the current switching control cycle.

BRIEF DESCRIPTION OF THE DRAWINGS

FIG. 7 is a lookup table.

DETAILED DESCRIPTION

Figure 1:
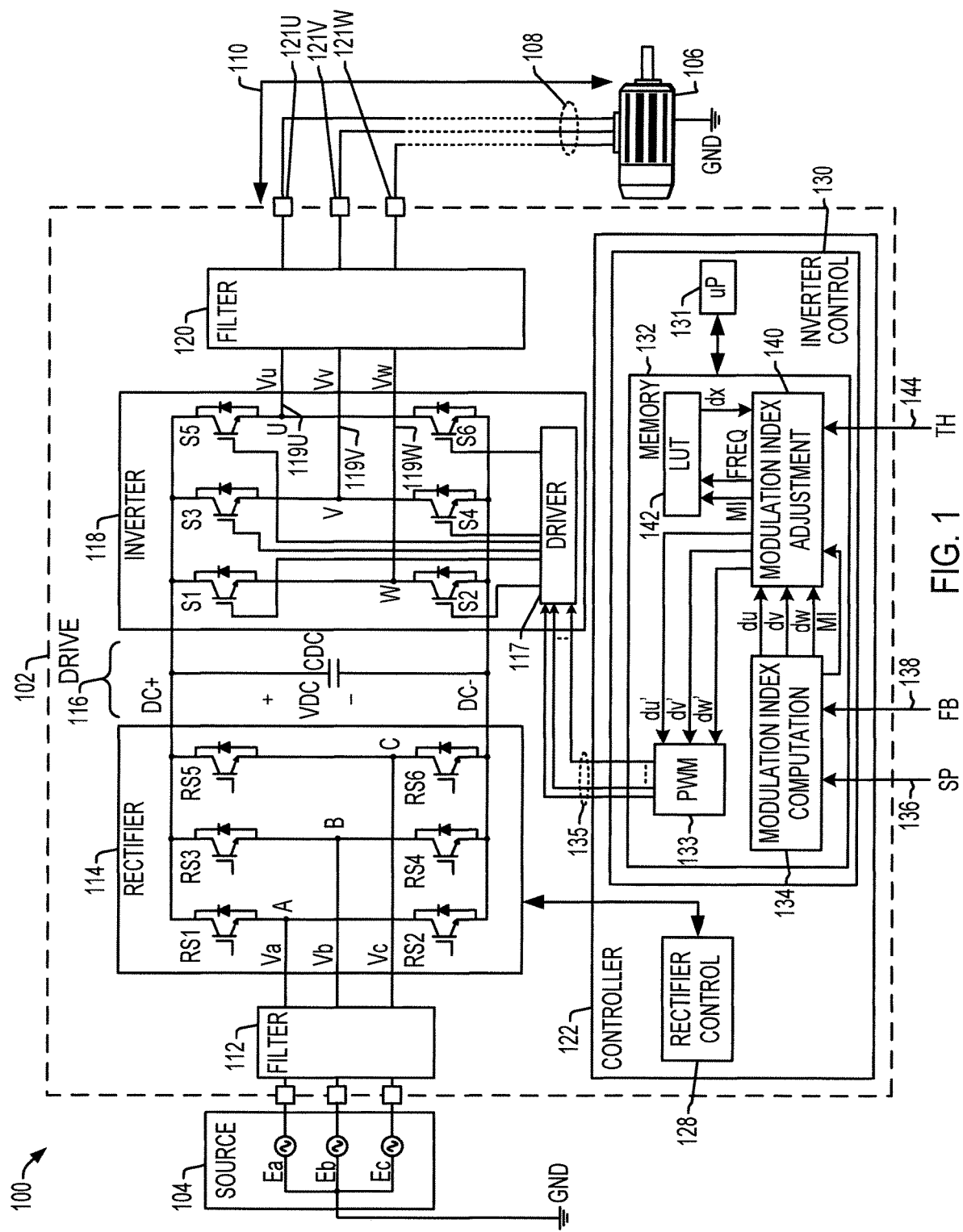
FIGS. 1-6 are schematic diagrams.

In a first portion of a switching control cycle, the low side inverter switch is turned on and the high side switch is turned off and current flows through a charging resistor and a diode to charge the high side bootstrap capacitor through the low side switch. In a second portion of the switching control cycle the high side bootstrap capacitor discharges. For over modulation conditions, the high side bootstrap capacitor may not hold the proper voltage throughout the entire switching control cycle, which can affect the performance of the power conversion system. Other solutions to this problem include using back EMF to recharge a bootstrap capacitor after a load coasting condition, but this solution requires coast conditions of a motor load. Other approaches use artificial pulse creation to charge a bootstrap capacitor, but require additional components in the driver circuitry. Further solutions involve modulation index limiting, which limits the minimum on-time for the low side switch to a duty cycle value that will send sufficient pulses to charge the bootstrap capacitor, but this approach limits the output voltage utilization of the overall system and undesirably derates the system capabilities.

Referring now to the figures, several embodiments or implementations are hereinafter described in conjunction with the drawings, wherein like reference numerals are used to refer to like elements throughout, and wherein the various features are not necessarily drawn to scale. The described systems and apparatus include selective modulation index adjustment functions an inverter controller and/or an active rectifier controller to facilitate proper charging of driver circuit bootstrap capacitors, particularly for high side switch drivers. In the following discussion and in the claims, the terms "including", "includes", "having", "has", "with", or variants thereof are intended to be inclusive in a manner similar to the term "comprising", and thus should be interpreted to mean "including, but not limited to . . . " Also, the term "couple" or "couples" is intended to include indirect or direct electrical or mechanical connection or combinations thereof. For example, if a first device couples to or is coupled with a second device, that connection may be through a direct electrical connection, or through an indirect electrical connection via one or more intervening devices and connections.

Referring initially to FIGS. 1-7, FIG. 1 shows an industrial system 100 with a motor drive power conversion system 102. The power conversion system 102 receives and converts AC electrical input power from a source 104 to drive a motor load 106 through a motor cable 108 having a cable length 110. The AC input and output of the converter 102 are three phase configurations in the illustrated examples. Other implementations are possible using any combination of single or multiphase inputs and outputs to drive the motor 106 or other type of load. The motor drive 102 receives single or multiphase AC input power from a grid or other AC power source 104 and converts this to a DC bus voltage using an active front end (AFE) rectifier 114 which provides a DC output voltage VDC to a DC bus circuit 116 having a first DC node DC+, a second DC node DC−, and one or more DC bus capacitors CDC. The example power conversion system 102 in FIG. 1 is a voltage source converter (VSC) motor drive, with an input filter 112 between the source 104 and the active rectifier 114, as well as a DC bus circuit 116 with a DC bus capacitor CDC, an inverter 118 with an inverter output 119 (e.g., output phase lines 119U, 119V and 119W), an output filter circuit (e.g., filter) 120 with output terminals 121U, 121V and 121W, and a controller or control circuit 122.

The example three phase AC power source 104 provides AC phase voltage signals Ea, Eb and Ec to the inputs of the input filter 112, and the filter 112 provides filtered AC input voltage signals Va, Vb and Vc to the respective phase input lines A, B and C of the active rectifier 114. The active rectifier 114 includes rectifier switching devices RS1, RS2, RS3, RS4, RS5 and RS6 (e.g., IGBTs, etc.) operated according to rectifier switching control signals from the controller 122 via a driver circuit 115 to convert input AC electrical power to provide the DC bus voltage in the DC bus circuit 116. Other configurations are possible in which the drive 102 receives input DC power from an external source (not shown) to provide an input to the inverter 118, in which case the rectifier 114 may be omitted. The illustrated motor drive 102 is a voltage source converter configuration including one or more capacitive storage elements in the DC bus circuit 116. The DC bus circuit 116 may include a single capacitor CDC or multiple capacitors connected in any suitable series, parallel and/or series/parallel configuration to provide a DC bus capacitance across the inverter input terminals DC+ and DC−.

The controller 122 includes a rectifier controller 128 that provides rectifier switching control signals to operate the switches RS1-RS6 of the rectifier 114. In the illustrated rectifier 114, the AC input includes AC nodes A, B and C, and the rectifier DC output includes first and second DC nodes labeled DC+ and DC− in FIG. 1. The switching circuit includes the rectifier switching devices RS1-RS6 coupled with the AC input and with the DC output, and individually configured to selectively couple a corresponding one of the AC nodes with a respective one of the first and second DC nodes according to a respective switching control signal from the rectifier controller 130.

The controller 122 also includes an inverter controller 130 that provides inverter switching control signals 135 to an inverter switch driver circuit 117 to operate the switches S1-S6 of the inverter 118 to regulate or control one or more of voltage, current, speed, torque, etc. The inverter controller 130 includes a processor 131 and an associated electronic memory 132 which stores program instructions to implement a closed loop control program to regulate or control operation of the inverter 118. The controller 122 in certain embodiments implements a motor speed and/or position and/or torque control scheme in which the controller 122 selectively provides the switching control signals to the inverter switches S1-S6 in a closed and/or open-loop fashion according to one or more setpoint values such as a motor speed setpoint 136 (SP) and one or more feedback signals or values 136 (FB). The setpoint in one example is a signal or value generated by the controller 122, or a fixed setpoint value, or such setpoint value can be received from an external system (not shown). In practice, the motor drive 102 may also receive a torque setpoint and/or a position (e.g., angle) setpoint, and such desired signals or values (setpoint(s)) may be received from a user interface and/or from an external device such as a distributed control system, etc. (not shown). As used herein, a signal can be an analog signal, such as a current or a voltage signal, or a signal can include digital values generated or consumed by the controller 122.

The controller 122 uses a modulation index (MI) control parameter to operate the inverter 118. The AC output voltage provided by the inverter 118 may depend on the DC bus voltage VDC and the inverter control modulation index MI in one example. The linear region of the modulation index in one example varies to a limit value, such as 1.15 for space vector modulation (SVPWM) control of the switching inverter circuit 118. The inverter controller 130 includes a modulator 133, such as a pulse width modulation (PWM) component that generates the inverter switching control signals to convert DC input power from the DC bus DC+, DC− to provide three phase AC output voltages Vu, Vv, Vw at the inverter AC connection nodes U, V, and W to drive the motor load 106. In one example, the memory 132 of the inverter controller 130 includes program instructions executable by the processor 131 to implement various control components, including a PWM modulator component 133 to provide the pulse width modulated inverter switching control signals 135 to the driver circuit 117.

The inverter controller 130 in the illustrated example includes a modulation index computation component 134 implemented by the processor 131 to generate (e.g., compute) the modulation index MI, along with corresponding first duty cycles du, dv, dw for each successive switching control cycle of the inverter 118. The first duty cycles du, dv, dw in one example represent high side switch on-times of the corresponding inverter output node or phase in a given switching control cycle. In addition, the controller 130 includes a modulation index adjustment component 140 implemented by the processor 131. The modulation index adjustment component 140 receives the computed first duty cycles du, dv, dw and modulation index MI for the current switching control cycle from the modulation index computation component 134.

The modulation index adjustment component 140 in one example selectively compares the modulation index MI to a non-zero threshold 144 (TH). Based on this comparison, the modulation index adjustment component 140 selectively adjusts the first duty cycles du, dv, dw to generate (e.g., compute) second duty cycles du', dv', dw', in one example by adding a non-zero offset value PCM to the first duty cycles du, dv, dw. In one implementation, the modulation index adjustment component 140 uses a lookup table (LUT) 142 in order to obtain a scaling factor dx that is a function of the modulation index MI and a frequency (FREQ) of a voltage or current of the inverter AC connection U, V, W. In one implementation, the modulation index computation component 134, the modulation index adjustment component 140, the lookup table 142, and the PWM component 133 are implemented as processor-executable components with associated program instructions executed by the processor 131. In other implementations, one or more of these components can be implemented in dedicated hardware, or separate digital circuits, or combinations thereof.

Figure 14:
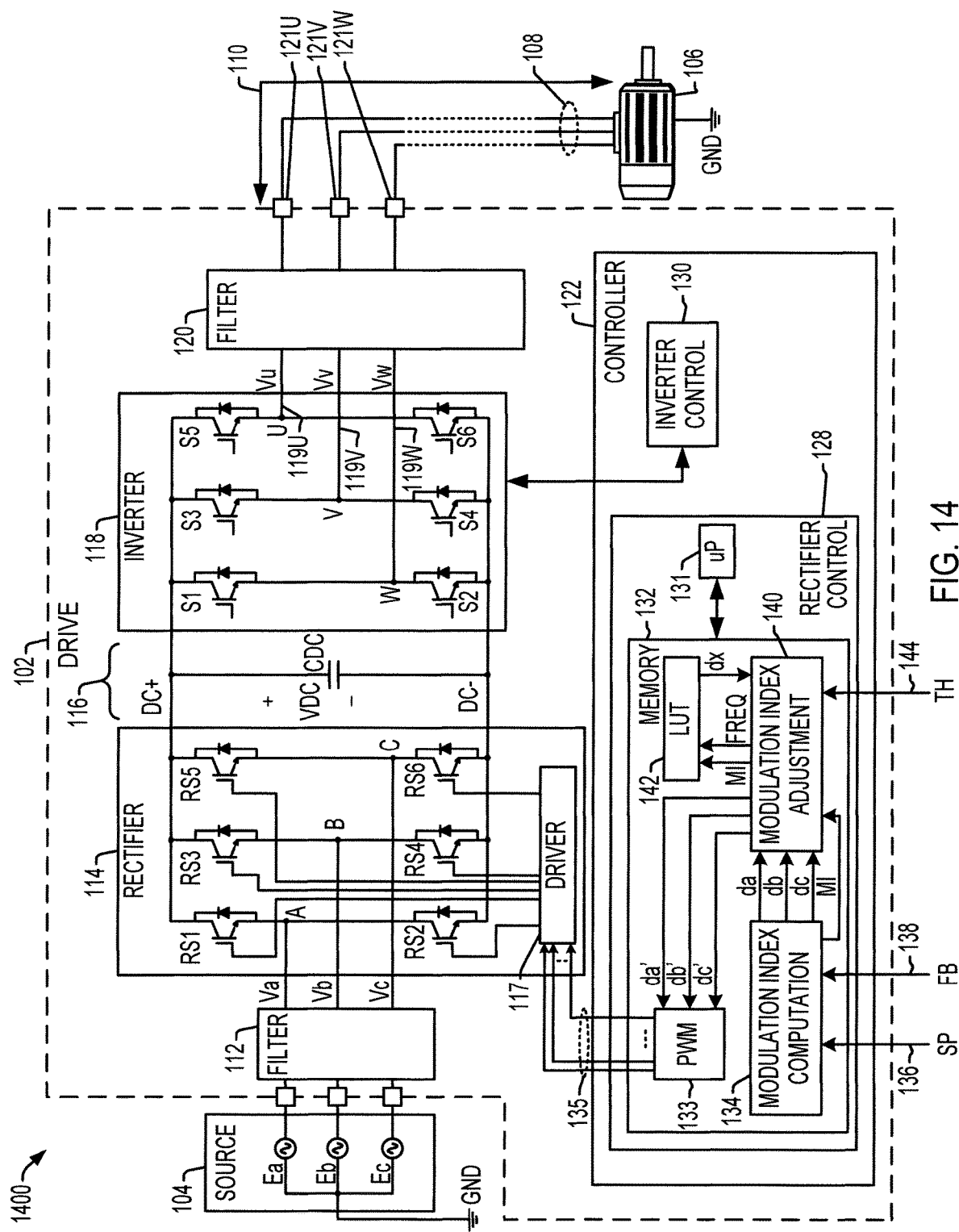
FIG. 14 is a schematic diagram.

In the example of FIG. 1, the system 102 includes the switching inverter 118 with an AC connection including the AC nodes U, V, W, as well as a DC connection that includes the first and second DC nodes DC+ and DC−. The selective modulation index adjustment functions of the inverter controller 130 are used to selectively modify operation of the switching inverter 118 to facilitate proper charging of driver circuit bootstrap capacitors, particularly for the high side inverter switching devices S1, S3 and S5 as described further below. In another implementation (e.g., FIG. 14 below), the AC connection is the AC input A, B, C of the rectifier 114, and the DC connection is the DC output (DC+, DC−) of the rectifier 114. In the example of FIG. 14 below, similar modulation index adjustment is provided in the rectifier controller 128 in order to facilitate bootstrap capacitor charging for the high side active rectifier switching devices RS1, RS2, and RS3.

In one example implementation, the inverter controller 130 operates with the modulation index adjustment component 140 selectively modifying the first duty cycles du, dv, dw to generate (e.g., compute) second duty cycles du', dv', dw', which are provided to the PWM component 133 as shown in FIG. 1. The PWM component 133 generates the pulse width modulated switching control signals 135 that are provided to the inverter circuit driver 117. The driver circuit 117 in this example provides signals to the inverter switching devices S1-S6 to selectively couple each given AC node U, V, W with one of the first and second DC nodes DC+, DC− according to the corresponding modified or unmodified duty cycle du', dv', dw' of a respective one of a plurality of switching control signals 135. Although FIG. 1 schematically illustrates the modulation index adjustment component 140 as providing the second duty cycles du', dv', dw' to the PWM component 133, the second duty cycles in this example can be unmodified versions of the first duty cycles du, dv, dw, depending on the value of the modulation index MI. The switching circuit S1-S6 in this example is coupled with the AC connection and with the DC connection, and includes high and low side switching devices S1-S6 coupled with a corresponding one of the AC nodes U, V, W. The high and low side switching devices for each given AC node U, V, W R respectively configured to selectively couple the given AC node U, V, W with one of the first and second DC nodes DC+, DC− according to the duty cycle du', dv', dw' of a respective one of the switching control signals 135 from the PWM component 133.

In operation, the controller 122 generates the inverter switching control signals 135 according to the duty cycles du', dv', dw' (e.g., modified or unmodified) for the current switching control cycle. In response to the modulation index MI exceeding the non-zero threshold TH, the controller 122 adjusts the duty cycles du, dv, dw. In one implementation, as described below in connection with FIGS. 5-8, the controller 122 computes the first duty cycles du, dv, dw according to the modulation index MI for the current switching control cycle, and in response to the modulation index MI being less than or equal to the non-zero threshold TH, generates the switching control signals 135 according to the first duty cycles du, dv, dw for the current switching control cycle. In response to the modulation index MI exceeding the non-zero threshold TH, the controller 122 computes the second duty cycles du', dv', dw', for example, by adding a non-zero offset value PCM to the first duty cycles du, dv, dw, and generates the switching control signals 135 according to the adjusted second duty cycles du', dv', dw' for the current switching control cycle.

In one example, the controller 122 computes the non-zero offset value PCM according to the modulation index MI, and a maximum or minimum value of the first duty cycles du, dv, dw for the current switching control cycle. In another example, the controller 122 computes the non-zero offset value PCM according to the modulation index MI, the maximum or minimum value of the first duty cycles du, dv, dw, and the scaling factor dx that is a function of the modulation index MI and a frequency of a voltage or current of the AC connection. In the illustrated example, the controller 122 uses the look up table 142 to determine the scaling factor dx. The look up table 142 includes scaling factor values dx indexed according to values of the modulation index MI and the frequency of the voltage or current of the AC connection. In another implementation, the controller 122 computes the scaling factor dx as a function of the modulation index MI and the AC connection frequency. As described further below in connection with FIGS. 8-13, the controller 122 in one example computes the non-zero offset value PCM as PCM=−dmin−|dx|, for 1−MI<−dmax−dmin, and as PCM=−dmax−|dx|, for 1−MI<−dmax−dmin, where dmin is the minimum value of the first duty cycles du, dv, dw, and dmax is the maximum value of the first duty cycles du, dv, dw for the current switching control cycle.

Figure 2:
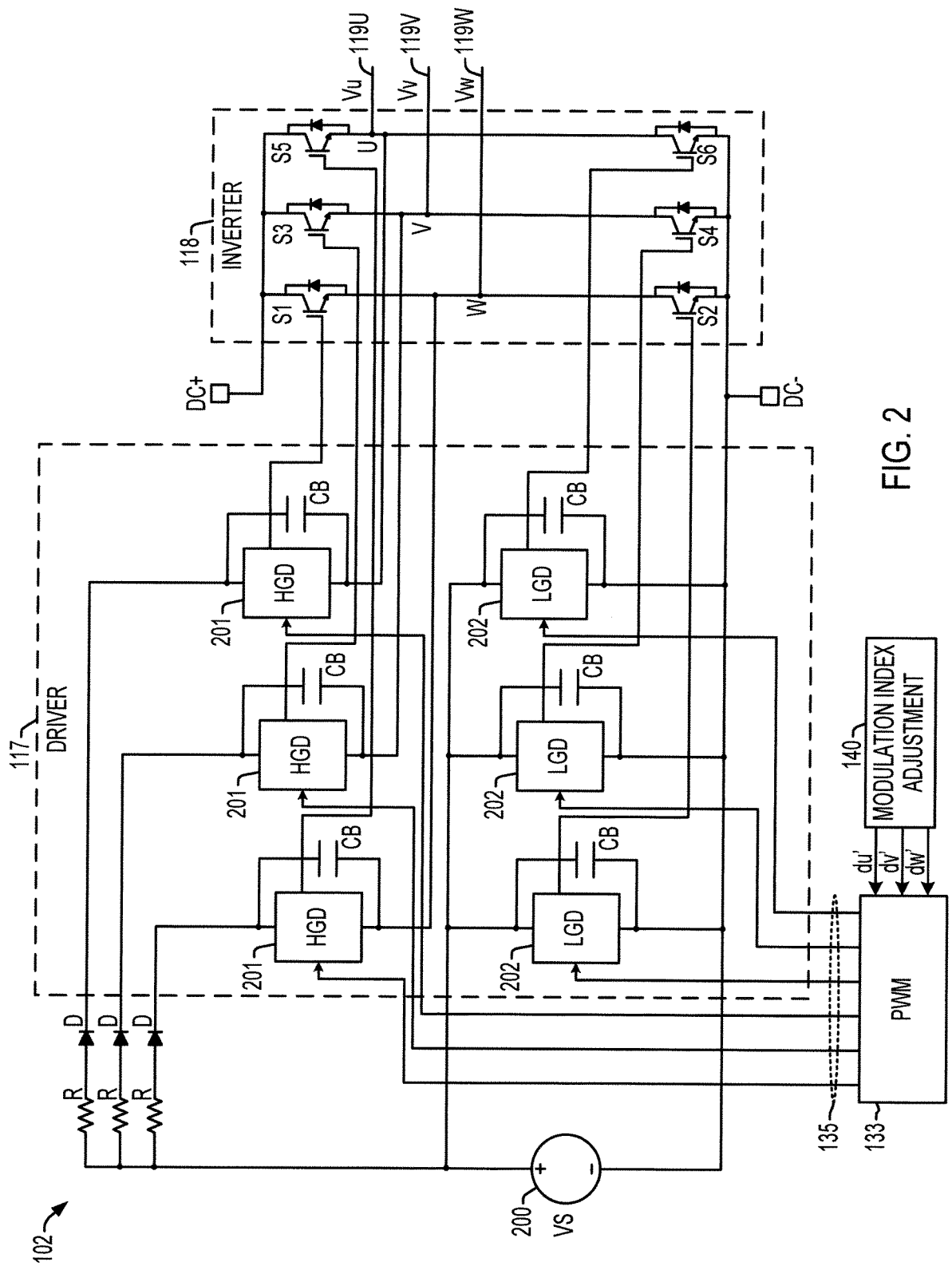
Figure 3:
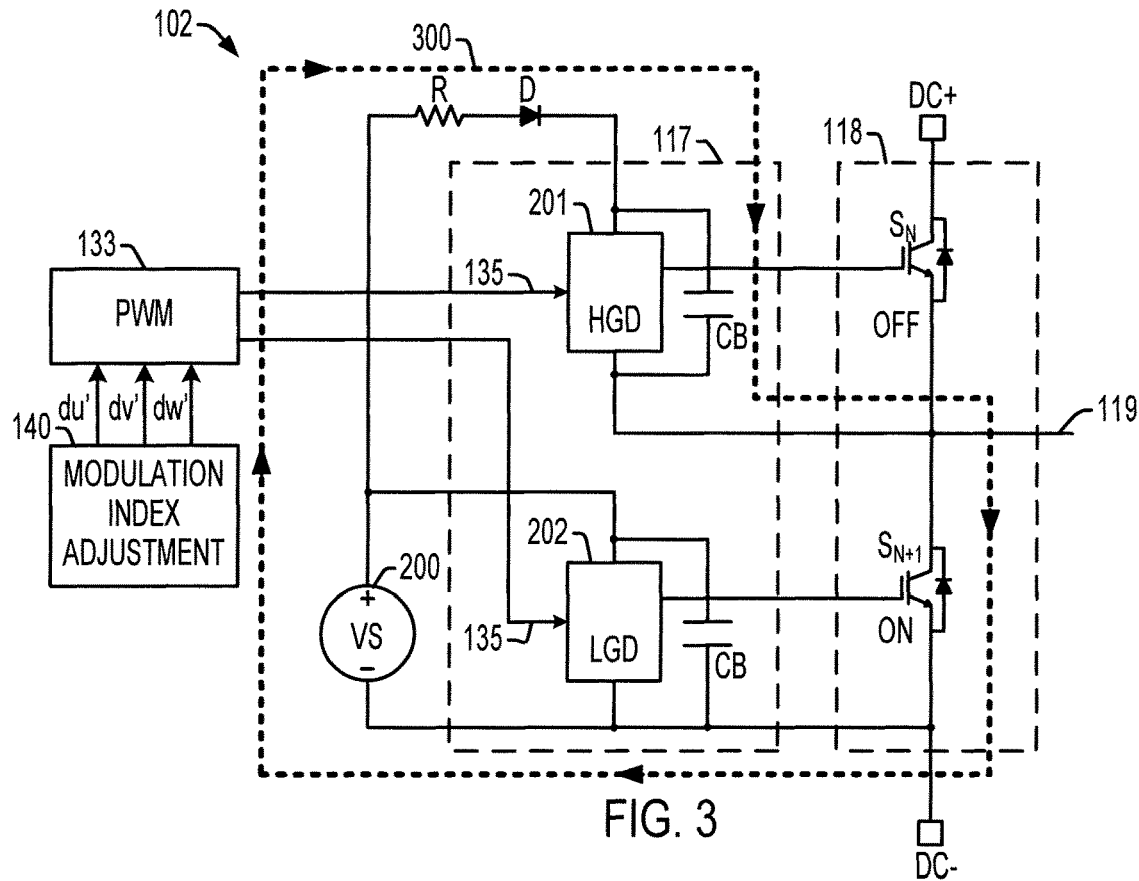
Figure 4:
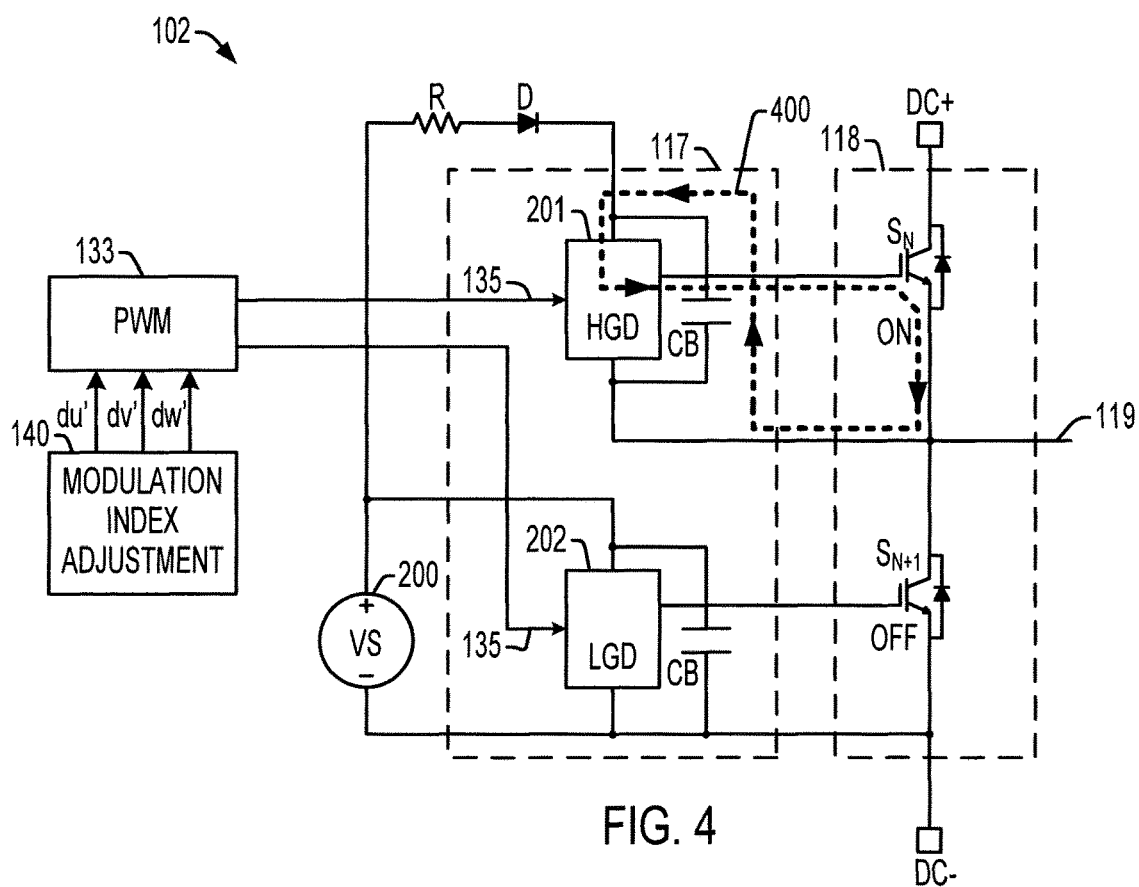

Referring also to FIGS. 2-4, the selective adjustment of the inverter duty cycles facilitates maintaining proper charging of bootstrap capacitors in the driver circuit 117. FIG. 2 shows further details of an example implementation of the inverter switch driver circuit 117. In this example, the driver circuit 117 is powered by a DC supply 200 that provides a DC output voltage VS, such as 15 V DC, 24 V DC, etc. The circuit 117 includes high side gate drivers (HGD) 201 and low side gate drivers (LGD) 202 that receive the pulse width modulated switching control signals 135 from the PWM component 133. Each of the driver circuits 201 and 202 includes a corresponding bootstrap capacitor CB connected between positive and negative supply connections of the associated driver circuit 201, 202. In the illustrated example, the positive supply connections of the low side driver circuits 202 are connected directly to the positive terminal of the DC supply 200, and the negative supply connections of the low side driver circuits 202 are connected to the second DC node DC−. In this example, moreover, the positive supply connections of the high side driver circuits 201 are connected to the positive terminal of the DC supply 200 through a corresponding resistor R and a charging diode D. The negative supply connections of the high side driver circuits 201 are connected to the corresponding one of the AC nodes U, V, W.

FIGS. 3 and 4 show the operation of the corresponding high and low side drivers 201, 202 for a single phase of the multiphase inverter with high and low side half bridge switches $S_N$ and $S_{N+1}$, respectively. FIGS. 3 and 4 show operation in respective first and second portions of a given inverter switching control cycle to illustrate the respective charging and discharging of the high side driver bootstrap capacitors CB. FIG. 3 illustrates a first portion of the switching control cycle in which the low side inverter switch $S_{N+1}$ is turned on and the high side switch $S_N$ is turned off. In this switch condition, current flows along a path 300 from the positive terminal of the DC supply 200 through the resistor R, the diode D to charge the high side bootstrap capacitor CB. The conduction path 300 continues from the lower bootstrap capacitor terminal through the low side switch $S_{N+1}$ back to the negative terminal of the DC supply 200. FIG. 4 shows a second portion of the switching control cycle that discharges the bootstrap capacitor CB of the high side gate driver 201. With the upper switch $S_N$ turned on, and the lower switch $S_{N+1}$ turned off, the capacitor discharges through the output terminal of the high side driver 201 along a discharge path 400 through the insulated gate of the IGBT switch $S_N$, to the emitter of the IGBT switch $S_N$, and back to the lower terminal of the bootstrap capacitor CB.

In an over modulation condition, the high side bootstrap capacitor CB may not hold the proper voltage throughout the entire switching control cycle, which can affect the performance of the power conversion system 102. For example, a motor drive power conversion system 102 may need to drive a motor load 106 (e.g., FIG. 1) through a cable 108 with a long cable length 110. Particularly when starting at low speed, the inverter 118 may go into over modulation, in which the modulation index MI is greater than 1. In particular, in certain operating conditions at high duty cycles, the bootstrap capacitor CB may not fully charge while the low side switch inverter switch $S_{N+1}$ is turned on (e.g., FIG. 3). This can cause distortion of the inverter output, which can reduce performance of the system in driving a motor or other load 106. Other solutions to this problem include recharging a bootstrap capacitor after a load coasting (e.g., hold) condition, for example, using back EMF, but this solution requires coast conditions of a motor load. Other approaches use artificial pulse creation to charge a bootstrap capacitor, but require additional components in the driver circuitry. In many situations, integrated power modules are used to construct driver circuits for inverters or active front end (AFE) rectifiers for motor drives or other power conversion systems, and modification of the integrated power module is costly or impractical. Further solutions involve modulation index limiting, which limits the minimum on-time for the low side switch to a duty cycle value that will send sufficient pulses to charge the bootstrap capacitor, but this approach limits the output voltage utilization of the overall system.

Figure 5:
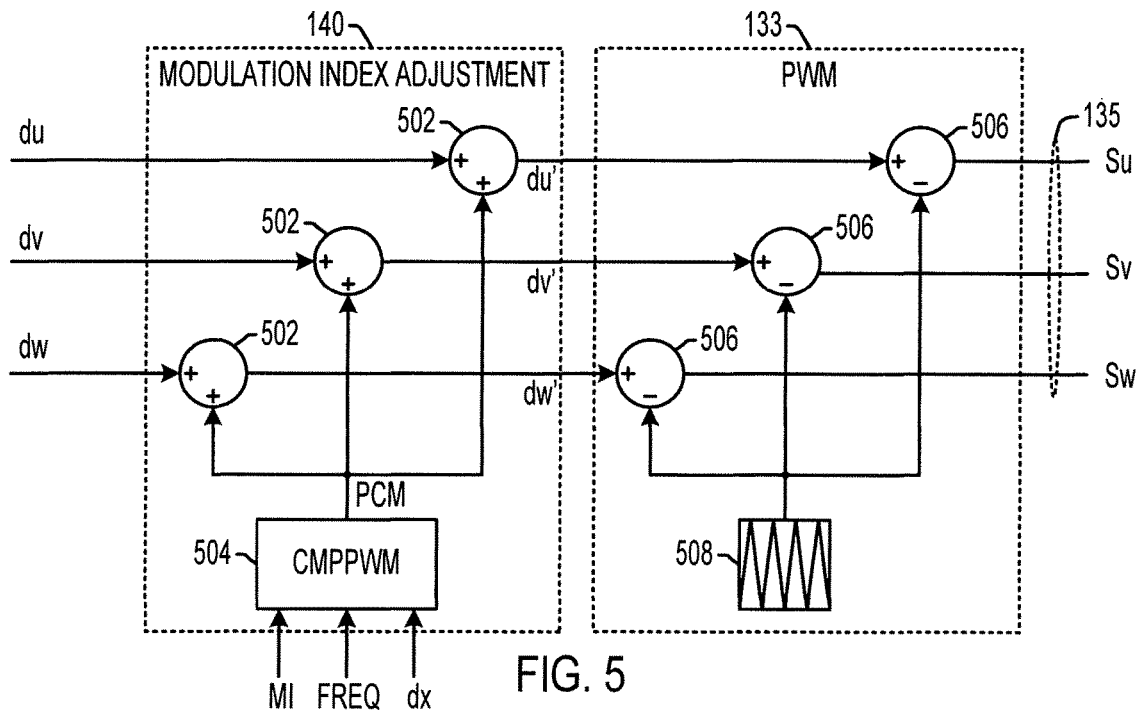
Figure 6:
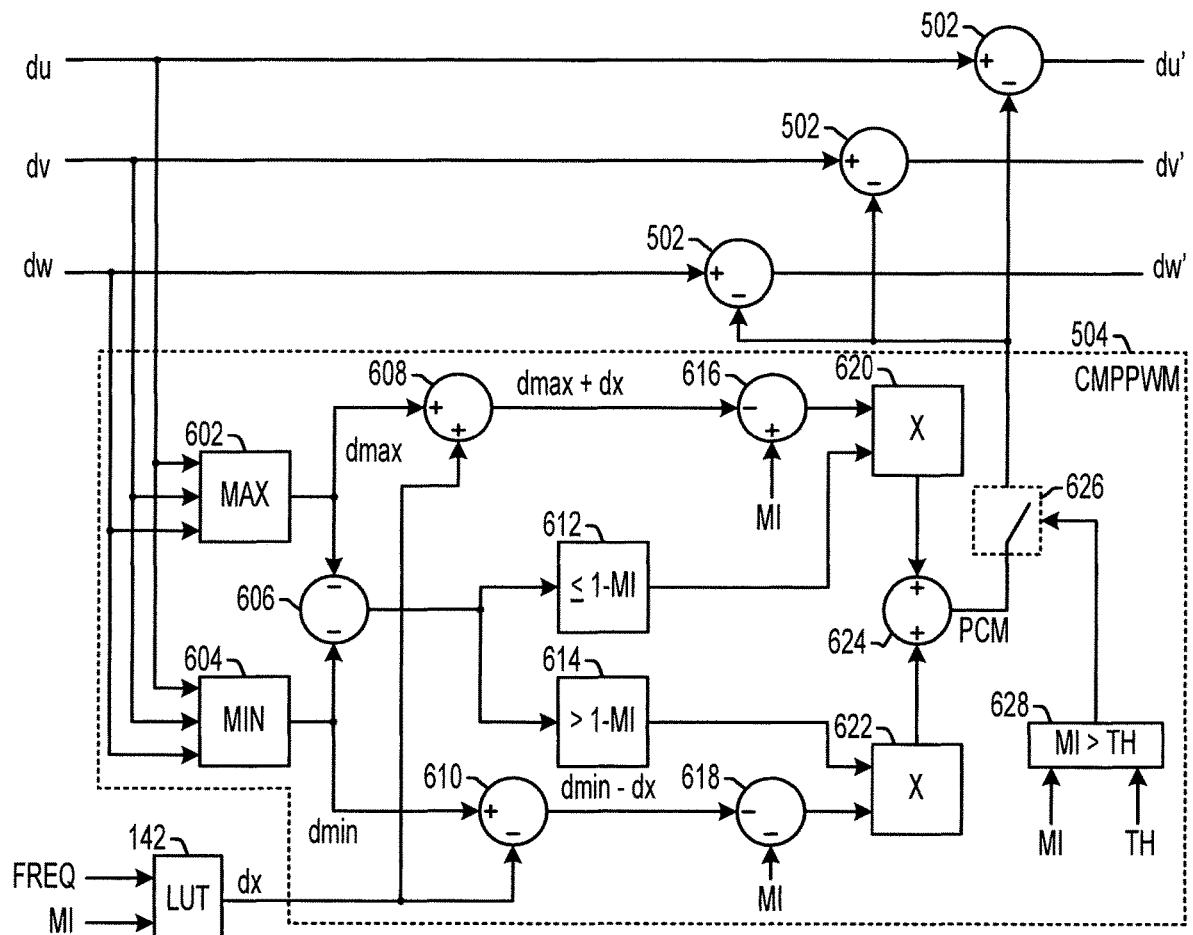

Referring also to FIGS. 5 and 6, the modulation index adjustment component 140 advantageously modifies the inverter duty cycles without undue restrictions on overall system output range. FIG. 5 shows further details of an example implementation of the modulation index adjustment component 140 and the PWM component 133. The modulation index adjustment component 140 in FIG. 5 includes summers 502 that individually add the non-zero offset value PCM to the first duty cycles du, dv, dw to generate the corresponding adjusted second duty cycles du', dv', dw' for the current switching control cycle. In this example, a common mode pulse PWM (CMPPWM) component 504 generates the non-zero offset value PCM and provides it to the summers 502. The PWM component 133 includes summers 506 and a ramp generator 508 that provides a modulating signal to the summers 506. The summers 506 subtract the modulating signal from the adjusted second duty cycles du', dv', dw' to generate pulse width modulated switching signals 135 (Su, Sv, Sw). The PWM component 133 in one example provides the signals Su, Sv, Sw for the respective high side inverter switches S1, S3, S5 and generates inverse signals (not shown in FIG. 5) for the low side switches S2, S4, S6. In digital implementations, the signals of FIGS. 5 and 6 are digital values.

FIG. 6 shows further details of an example implementation of the CMPPWM component 504 of FIG. 5. The CMPPWM component 504 includes a maximum (MAX) component 602 and a minimum (MIN) component 604 with inputs that receive the first duty cycles du, dv, dw and outputs provided to a summer 606. The maximum component 602 outputs the maximum value of the first duty cycles du, dv, dw (e.g., dmax), and the minimum component 604 outputs the minimum value of the first duty cycles du, dv, dw (e.g., dmin). The output of the maximum component 602 also provides an input to a summer 608, and the output of the minimum component 604 also provides an input to a summer 610. The summers 608 and 610 also receive the scaling factor dx from the LUT 142. The summer 606 provides an output (e.g., −dimin−dmax) to comparators 612 and 614. The comparator 612 provides an active output in response to the output of the summer 606 being less than or equal to 1−MI (e.g., −dimin−dmax≤1−MI), and otherwise the comparator 614 provides an active output (e.g., −dimin−dmax>1−MI).

The summer 608 provides an output (e.g., dmax+dx) that is subtracted by a summer 616 from the modulation index MI. The summer 610 provides an output (e.g., dmin+dx) that is subtracted by a summer 618 from the inverse of the modulation index MI. When the comparator 612 provides an active output (e.g., −dimin−dmax≤1−MI), the output of the summer 616 is passed through a gate 620 to a summer 624. When the comparator 614 provides an active output (e.g., −dimin−dmax>1−MI), the output of the summer 618 is passed through a gate 622 to the summer 624. The output of the summer 624 provides the non-zero offset value PCM to a switch 626 controlled by the output of the comparator 628. The comparator 628 compares the modulation index MI to the non-zero threshold TH to control the switch 626. The output of the switch 626 selectively provides the non-zero offset value PCM to the summers 502 of the modulation index adjustment component 140 as seen in FIG. 5. In this manner, the controller 122 computes the non-zero offset value PCM as PCM=−dmin−|dx|, for 1−MI<−dmax−dmin, and as PCM=−dmax−|dx|, for 1−MI<−dmax−dmin for the current switching control cycle, and selectively offsets the first duty cycles du, dv, dw to provide the adjusted second duty cycles first duty cycles du', dv', dw' to the PWM component 133.

FIG. 7 shows an example implementation of the lookup table (LUT) 142. The controller 122 uses the lookup table 142 to obtain a scaling factor dx according to the modulation index MI and the frequency of the voltage or current of the inverter AC connection U, V, W. The look up table 142 in this example includes scaling factor values dx indexed according to values of the modulation index MI and the frequency of the voltage or current of the AC connection. In one example, the lookup table entries for the scaling factor dx are empirically programmed for a given system and bootstrap capacitor size and value such that the high side bootstrap capacitors (e.g., CB in FIGS. 3 and 4 above) are properly charged during operation of the power conversion system 102.

Figure 8:
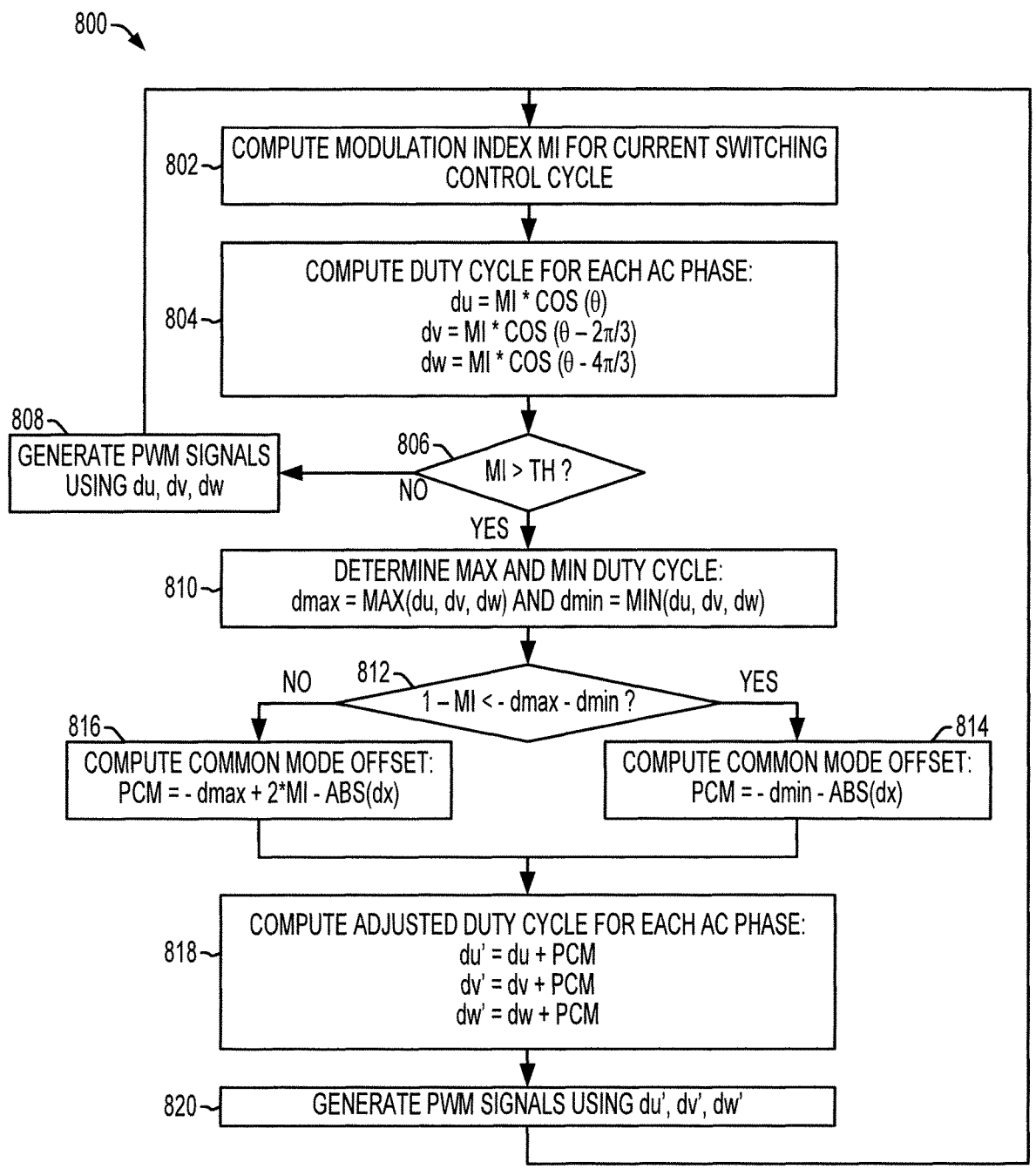
FIG. 8 is a flow diagram.

FIG. 8 shows an example method 800 for operating a power conversion system, and is described hereinafter in connection with operation of the example power conversion system 102 of FIG. 1 above. In accordance with further aspects of the present disclosure, the method 800 may be implemented in the form of computer executable instructions stored in a tangible, non-transitory computer readable medium, such as in the electronic memory 132 operatively associated with the processor 131 in the examples of FIGS. 1 and 14.

In operation, the method 800 includes selectively adjusting duty cycles of a switching power converter, whether the inverter 118 in the system 102 above, or an active front and rectifier, such as the rectifier 114 of the system 102, as shown in FIG. 14 below. The example method 800 shows operation in a single switching control cycle, and is repeated for each successive control cycle, with the controller 120 to selectively modifying the specific ones of the switching converter duty cycles according to the value of the current modulation index MI relative to the non-zero threshold TH, with the selectively applied non-zero offset PCM being applied based on which converter phase is maximal. This provides continuity with respect to power delivered to the load in the case of an inverter, while enhancing the on-time of the low side switches associated with non-maximal AC nodes.

The current switching control cycle begins at 802 in FIG. 8, where the controller 122 computes the modulation index MI for the current switching control cycle. In one example, the controller 122 computes the modulation index MI at 802 according to one or more set point values and one or more feedback values (e.g., setpoint 136 and feedback value 138 in FIG. 1). At 804 in FIG. 8, the controller 122 computes a duty cycle value for each AC phase or A/C node of the AC connection. In the illustrated example, the controller 122 computes the duty cycles du, dv, dw at 804 according to the modulation index MI for the current switching control cycle, where each of the first duty cycle values du, dv, dw corresponds to a respective one of the plurality of AC nodes U, V, W of the power conversion system 102. A determination is made at 806 as to whether the modulation index MI exceeds (i.e., is greater than) the non-zero threshold TH. If not (NO at 806), the controller 122 generates the PWM switching control signals 135 at 808 using (e.g., according to, or based at least partially on) the first duty cycle values du, dv, dw for the current switching control cycle in response to the modulation index MI being less than or equal to a non-zero threshold TH.

In response to the modulation index MI exceeding the non-zero threshold TH (YES at 806), the method 800 proceeds to adjust the duty cycles du, dv, dw at 810, 812, 814, 816, and 818 by the non-zero offset value PCM according to the modulation index MI. At 810, the controller 122 in one example determines the maximum and minimum value of the first duty cycles (e.g., dmax and dmin). At 812, the controller 122 compares the quantities 1−MI and −dmax−dmin, and computes the non-zero common mode offset PCM at 814 or 816 for the current switching control cycle based on the comparison. Where 1−MI<−dmax−dmin (YES at 812), the controller 122 computes PCM =−dmin−Idx at 814. Otherwise (NO at 812 for 1−MI<−dmax−dmin), the controller 122 computes the common mode offset PCM=−dmax+2MI−Idx at 816. At 818, the controller 122 computes the second duty cycles du', dv', dw' by adding the non-zero common mode offset value PCM to the first duty cycles du, dv, dw (du'=du+PCM, dv'=dv+PCM, and dw'=dw+PCM). At 820, the controller 122 generates a pulse width modulated switching control signals using the second duty cycles du', dv', dw' for the current switching control cycle. The method 800 then returns for the next switching control cycle at 802 as described above.

Figure 9:
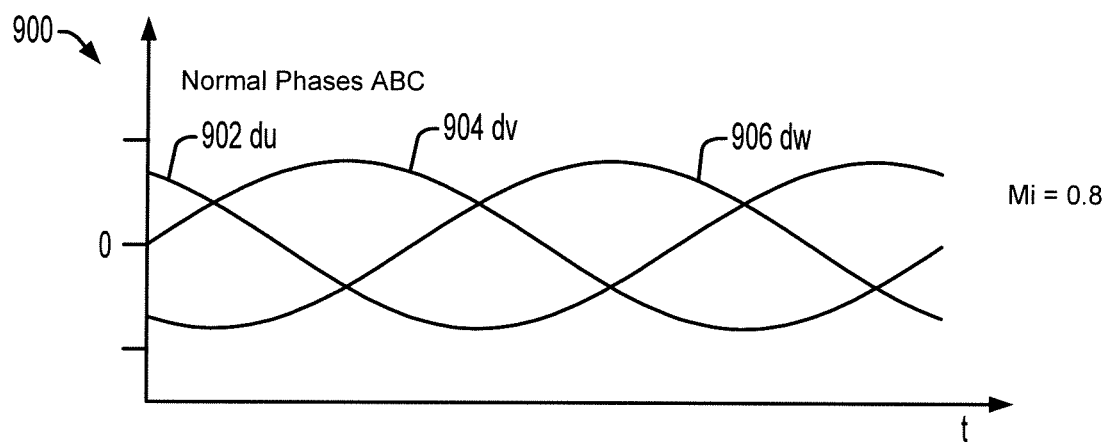
FIGS. 9-13 are signal diagrams.
Figure 9:
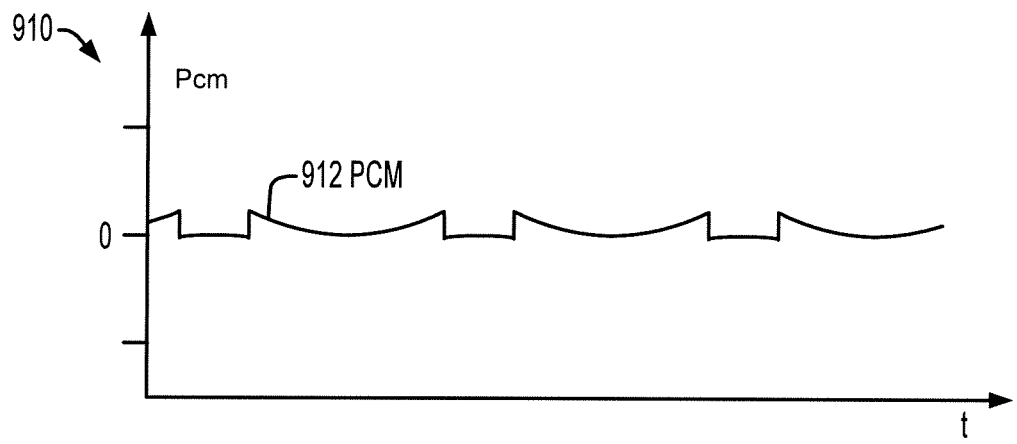
Figure 9:
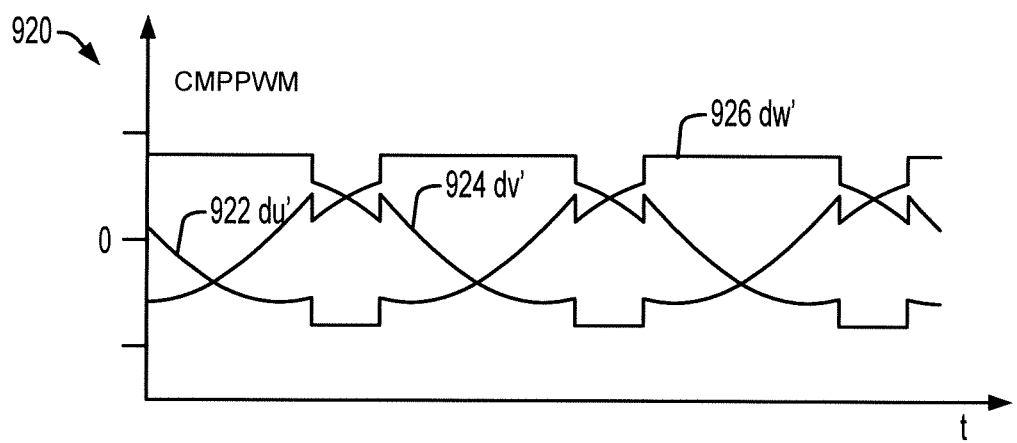

FIGS. 9-13 provide graphs or signal diagrams showing unmodified and modified duty cycles in the common mode offset value PCM under various operating conditions with a threshold value TH of 1.0. FIG. 9 shows a graph 900 with curves 902, 904, and 906 respectively representing examples of the (unmodified) first duty cycles du, dv, dw for operation of the power conversion system (e.g., the inverter 118) at a modulation index MI=0.8 below the threshold. A graph 910 in FIG. 9 shows a curve 912 representing the computed, mode offset value PCM, and a graph 920 shows example adjusted second duty cycles du', dv', dw' (curves 922, 924, and 926 respectively). In this example, with a threshold TH=1.0, the second duty cycles in the graph 920 are not used, and the controller 122 generates the PWM signals using the first duty cycles du, dv, dw (e.g., at 808 in FIG. 8 above).

Figure 10:
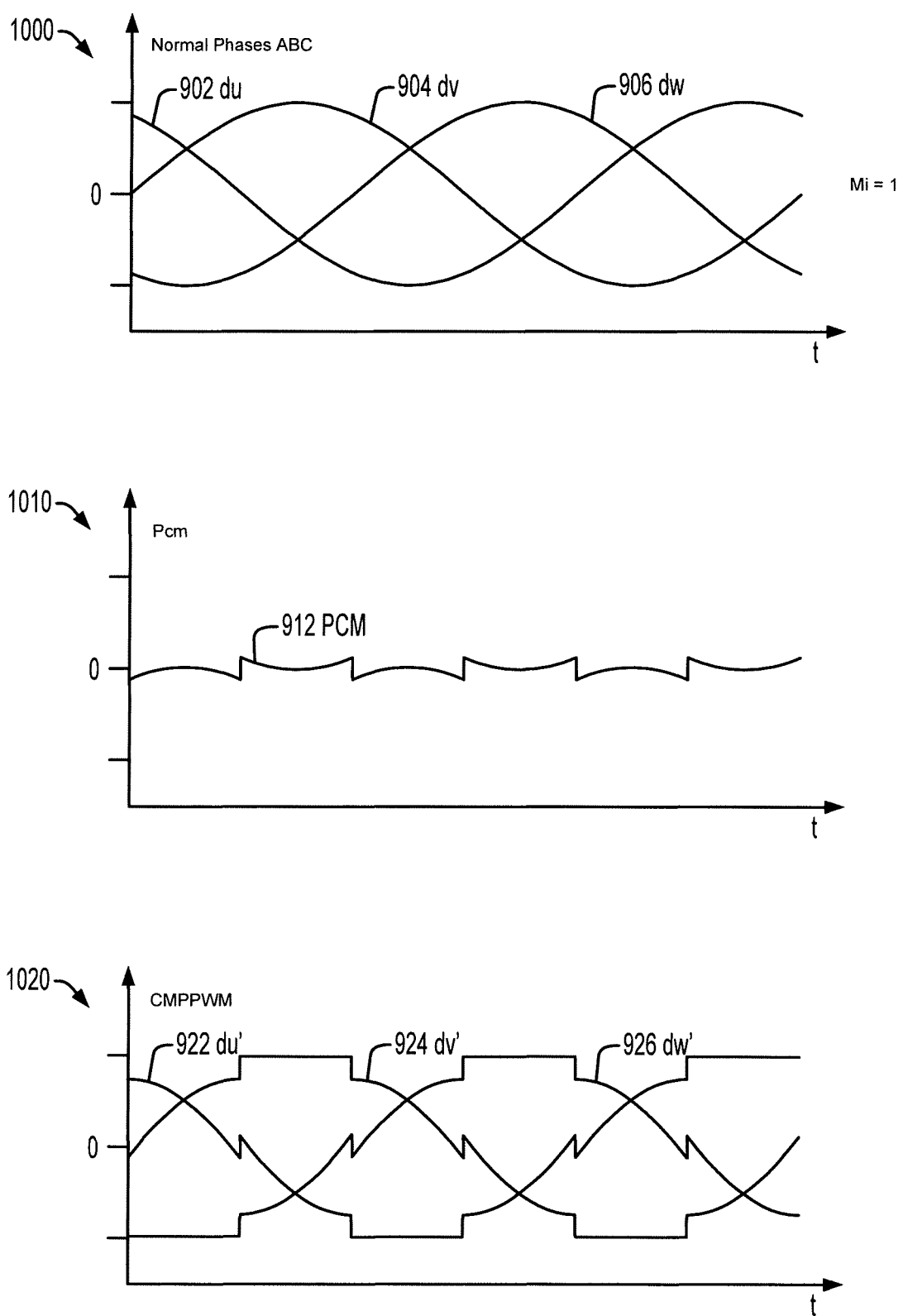

FIG. 10 includes a graph 1000 showing the curves 902, 904, and 906 respectively representing examples of the first duty cycles du, dv, dw for operation of the power conversion system at a modulation index MI=1.0. FIG. 10 also includes a graph 1010 showing the PCM curve 912, as well as a graph 1020 showing the second duty cycle curves 922, 924, and 926 for this case. As with the operation at MI=0.8 in FIG. 9 above, the controller 122 generates the PWM signals using the first duty cycles du, dv, dw (e.g., at 808 in FIG. 8 above).

Figure 11:
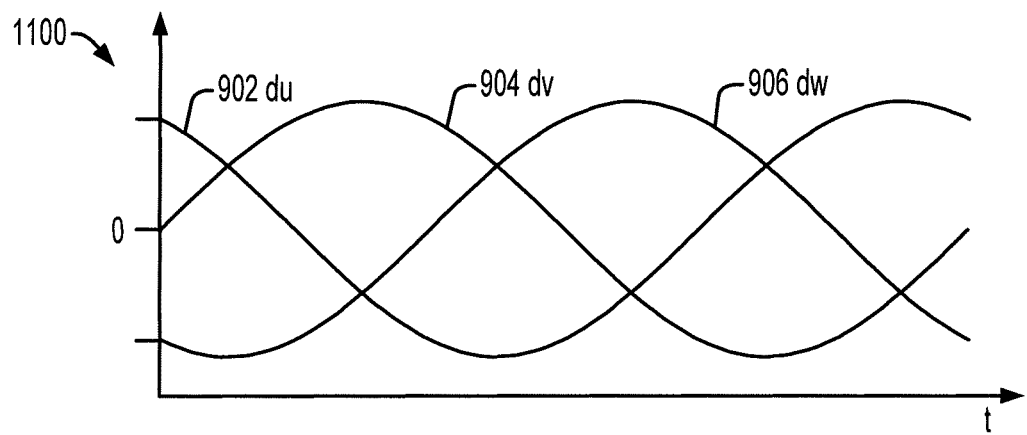
Figure 11:
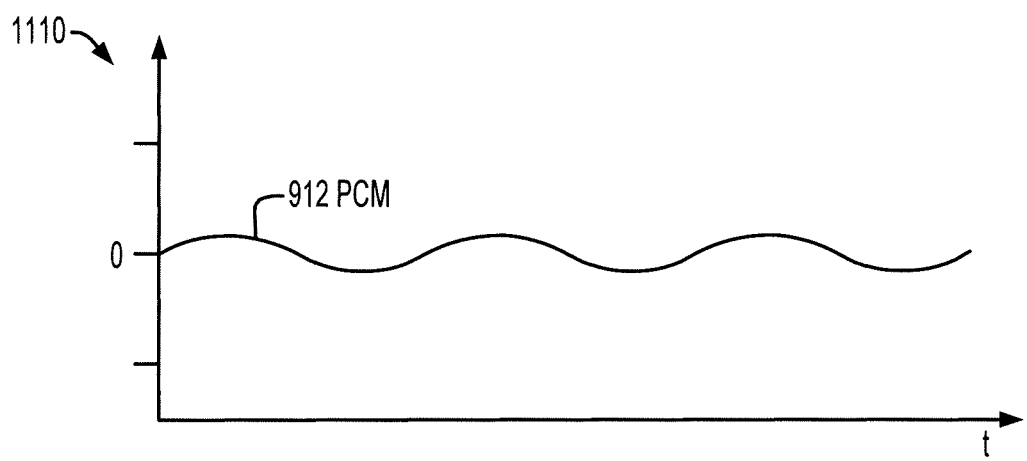
Figure 11:
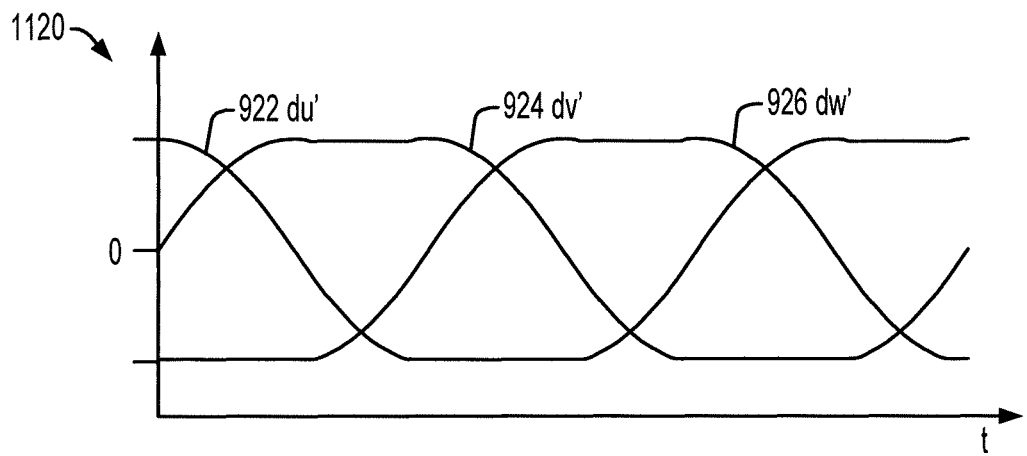
Figure 12:
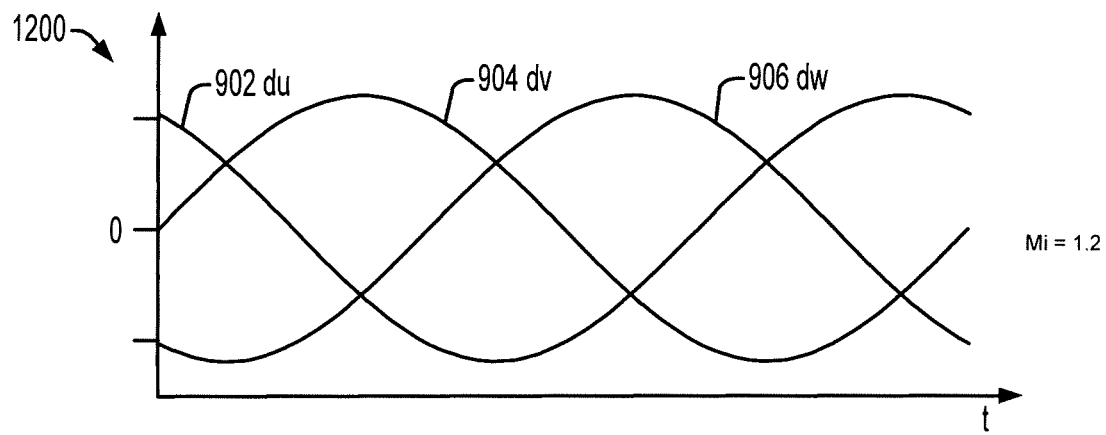
Figure 12:
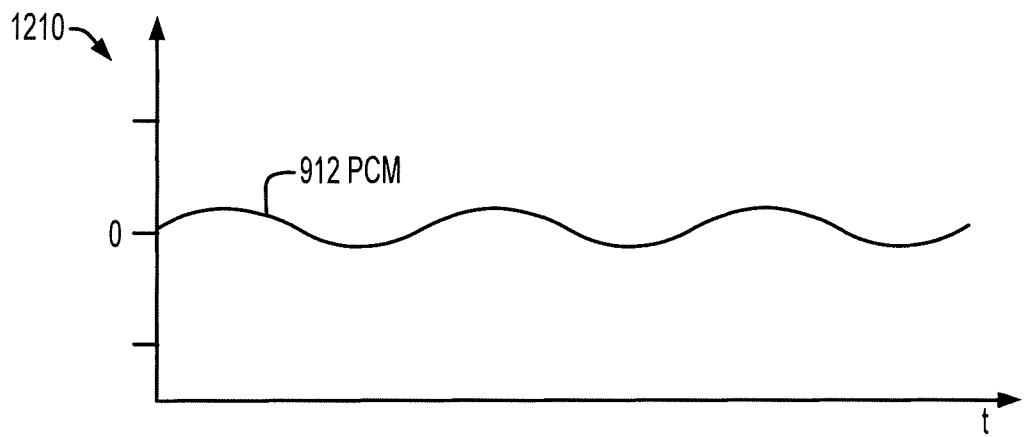
Figure 12:
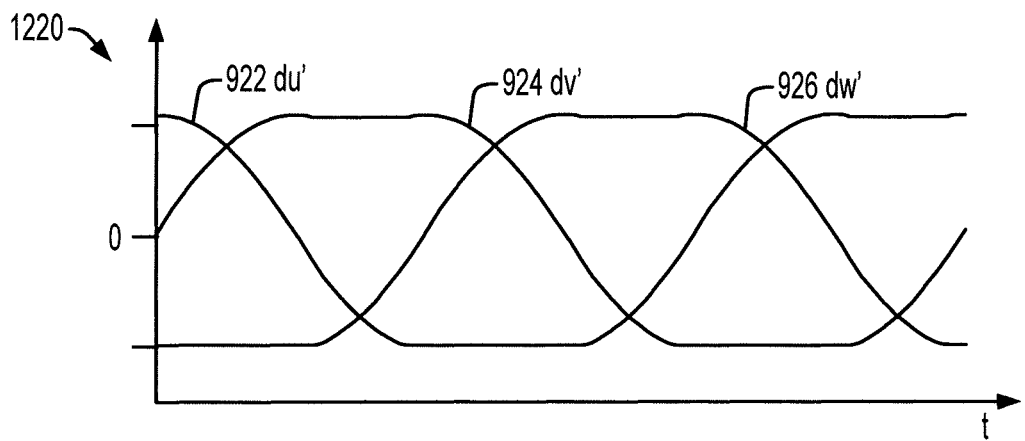
Figure 13:
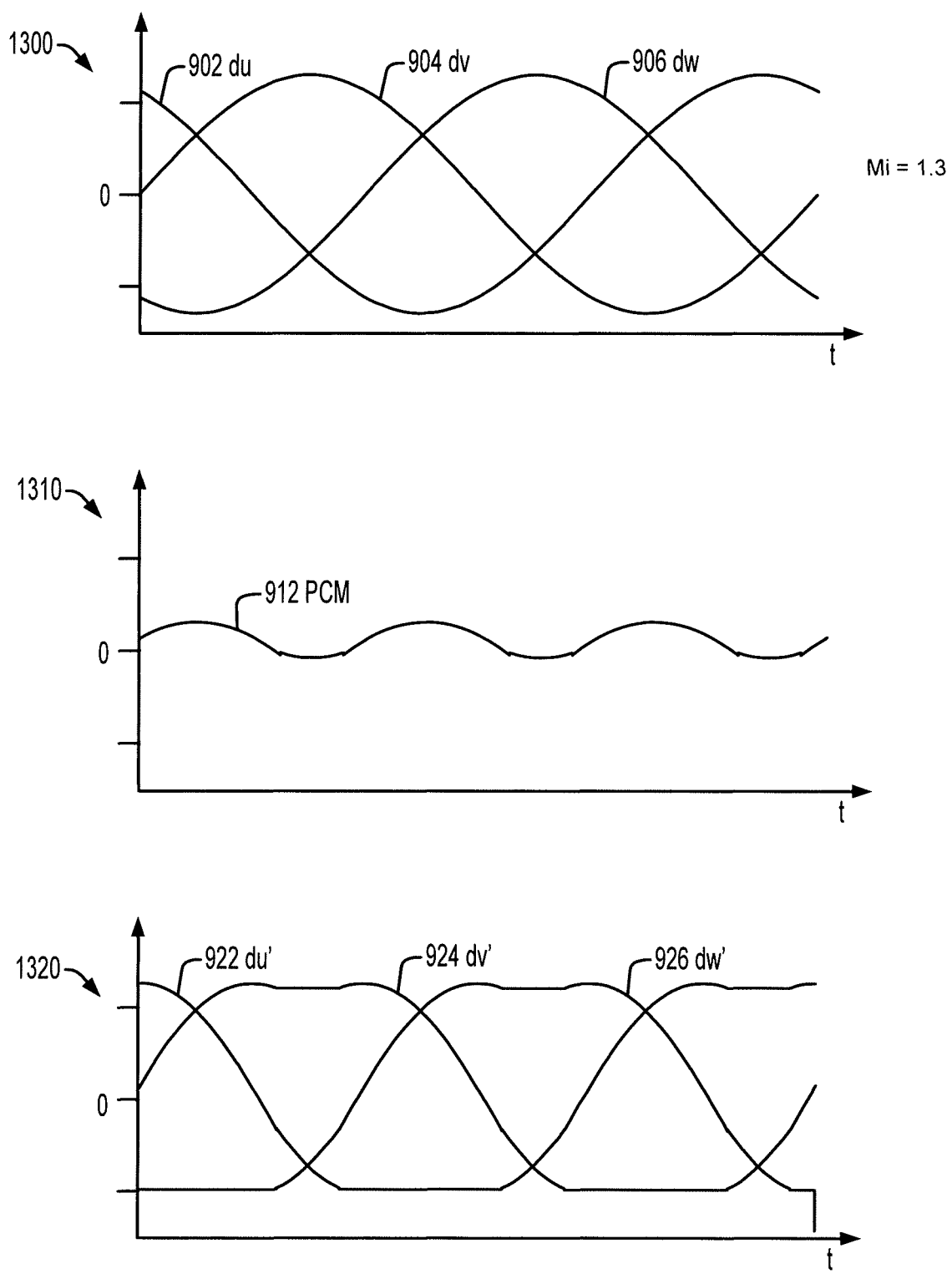

FIGS. 11-13 illustrate the controller operation when the modulation index MI exceeds the threshold TH. In operation, the controller 120 to effectively modifies the duty cycles such that the non-time of the lower switch is associated with AC nodes having non-maximal or non-minimal duty cycle values, and reduces the non-time of the upper switch associated with the AC node having the maximal or minimal duty cycle value. This provides extra time, particularly for over modulated operating conditions, for the lower switches to charge the associated bootstrap capacitors CB. Consequently, the AC waveform is not distorted, while the power conversion system 102 can provide expanded operating range without undesirable derating. FIG. 11 shows a graph 1100 illustrating the curves 902, 904 and 906 that represent the first duty cycles du, dv, dw, as well as a graph 1110 that illustrates the PCM curve 912, for the case where the modulation index MI=1.15. The graph 1120 in FIG. 11 shows the adjusted second duty cycles du', dv', dw' in curves 922, 924, 926, respectively. The adjustment through the computation of the common mode offset (e.g., 814 and 816 in FIG. 8) limits the extent of the second duty cycle values to +/− dx from the lookup table 142. FIG. 12 includes graphs 1200, 1210 and 1220 that showed example operation with the modulation index MI=1.2, and graphs 1300, 1310 and 1320 in FIG. 13 illustrate operation with the modulation index MI=1.3.

FIG. 14 shows another example implementation of the industrial system 100 with the motor drive power conversion system 102 as described above. Unlike the Example of FIG. 1, the motor drive 102 in FIG. 14 employs selective modulation index adjustment in controlling the active front and rectifier 114. In this example, the AC connection is the AC input of a rectifier 114, and the DC connection is a DC output of the rectifier 114. In other implementations, the described selective modulation index adjustment can be used in both an active rectifier and a switching inverter in a single system. The rectifier controller 128 in FIG. 14 includes the above described processor 131 and memory 132, where the rectifier controller 128 has a PWM component 133 that provides rectifier switching control signals 135 to the driver circuit 117 coupled with the rectifier switches RS1-RS6. In certain implementations, moreover, the memory 132 of the rectifier controller 128 includes program instructions corresponding to a modulation index component 134, a modulation index adjustment component 140, and a lookup table 142 as previously described in connection with the inverter control concepts in the system of FIG. 1.

Figure 15:
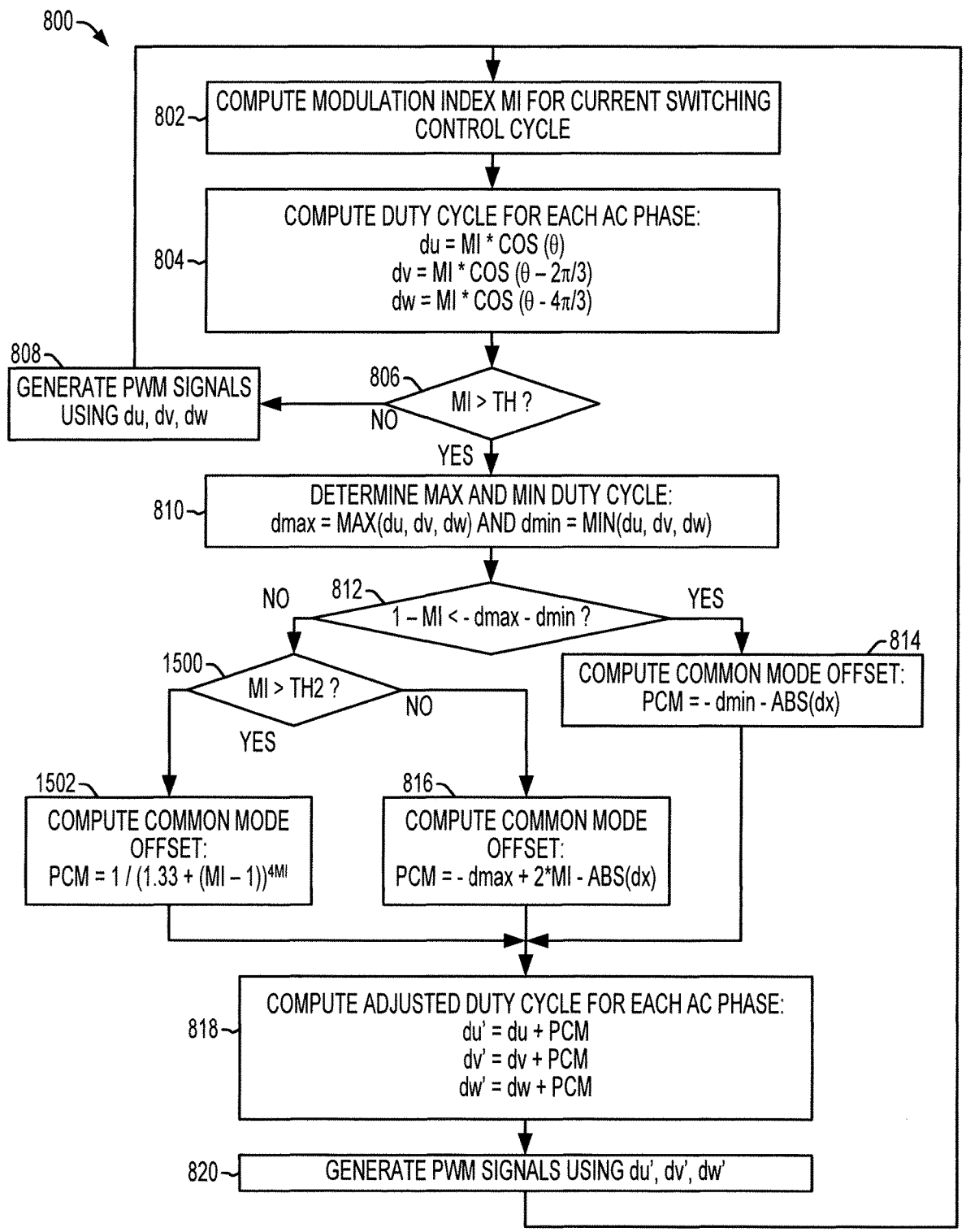
FIG. 15 is a flow diagram.

FIG. 15 shows another example implementation of the method 800 includes acts or events at 802-810 generally as described above in connection with FIG. 15. In this example, the controller 122 compares the quantities 1−MI and −dmax−dmin at 812, and computes the non-zero common mode offset PCM at 814, 816, or 1502 for the current switching control cycle based on the comparison. Where 1−MI<−dmax−dmin (YES at 812), the controller 122 computes PCM =−dmin−Idx at 814 as described above. Otherwise (NO at 812 for 1−MI<−dmax−dmin), the controller 122 determines at 1500 whether the modulation index MI exceeds a second threshold TH2 (e.g., TH2=1.15). If not (NO at 1500 for TH1<MI<TH2), the controller 122 computes the common mode offset PCM=−dmax+2MI−Idx at 816. Otherwise (YES at 1500 for MI>TH2), the controller 122 computes the common mode offset PCM=1(1.33+(MI−1))$^{4MI}$ at 1502.The controller 122 completes the switching cycle at 818 and 820 as described above using the computed offset PCM. At 818, the controller 122 computes the second duty cycles du', dv', dw' by adding the non-zero common mode offset value PCM to the first duty cycles du, dv, dw (du'=du+PCM, dv'=dv+PCM, and dw'=dw+PCM). At 820, the controller 122 generates a pulse width modulated switching control signals using the second duty cycles du', dv', dw' for the current switching control cycle. The method 800 then returns for the next switching control cycle at 802 as described above.

In the preceding specification, various embodiments have been described with reference to the accompanying drawings. It will be evident that various modifications and The following is claimed:

1. A power conversion system, comprising:
   an AC connection, including a plurality of AC nodes;
   a DC connection, including first and second DC nodes;
   a switching circuit coupled with the AC connection and with the DC connection, the switching circuit including high and low side switching devices coupled with a corresponding one of the AC nodes, the high and low side switching devices for each given AC node respectively configured to selectively couple the given AC node with one of the first and second DC nodes according to a duty cycle of a respective one of a plurality of switching control signals; and
   a controller configured to:
      compute a plurality of first duty cycles according to the modulation index for the current switching control cycle, each first duty cycle corresponding to a respective one of the plurality of AC nodes; and
      in response to a modulation index exceeding a non-zero threshold,
      compute a plurality of second duty cycles by adding a non-zero offset value to the first duty cycles, each second duty cycle corresponding to a respective one of the plurality of AC nodes.

2. The power conversion system of claim 1, wherein the controller is configured to:
   in response to the modulation index being less than or equal to the non-zero threshold, generate the plurality of switching control signals according to the first duty cycles for the current switching control cycle; and
   in response to the modulation index exceeding the non-zero threshold:
   generate the plurality of switching control signals according to the second duty cycles for the current switching control cycle.

3. The power conversion system of claim 2, wherein the controller is configured to compute the non-zero offset value according to the modulation index, and a maximum or minimum value of the first duty cycles.

4. The power conversion system of claim 3, wherein the controller is configured to compute the non-zero offset value according to:
   the modulation index,
   the maximum or minimum value of the first duty cycles, and
   a scaling factor that is a function of the modulation index and a frequency of a voltage or current of the AC connection.

5. The power conversion system of claim 4, further comprising a look up table, including a plurality of scaling factor values indexed according to values of the modulation index and the frequency of the voltage or current of the AC connection.

6. The power conversion system of claim 4, wherein the controller is configured to compute the non-zero offset value as:
   $PCM=-dmin-|dx|$, for $1-MI<-dmax-dmin$; and
   $PCM=-dmax+2MI-|dx|$, for $1-MI<-dmax-dmin$;
   wherein PCM is the non-zero offset value, dmin is the minimum value of the first duty cycles, dx is the scaling factor, MI is the modulation index, and dmax is the maximum value of the first duty cycles.

7. The power conversion system of claim 4, wherein the controller is configured to compute the non-zero offset value as:
   $PCM=-dmin-|dx|$, for $1-MI<-dmax-dmin$;
   $PCM=-dmax+2MI-|dx|$, for $1-MI<-dmax+2MI-dmin$, and for $MI<TH2$; and
   $PCM=1(1.33+(MI-1))^{4MI}$;
   wherein PCM is the non-zero offset value, dmin is the minimum value of the first duty cycles, dx is the scaling factor, MI is the modulation index, TH2 is a second non-zero threshold greater than the non-zero threshold, and dmax is the maximum value of the first duty cycles.

8. The power conversion system of claim 2, wherein the controller is configured to compute the non-zero offset value according to:
   the modulation index,
   a maximum or minimum value of the first duty cycles, and
   a scaling factor that is a function of the modulation index and a frequency of a voltage or current of the AC connection.

9. The power conversion system of claim 8, wherein the controller is configured to compute the non-zero offset value as:
   $PCM=-dmin-|dx|$, for $1-MI<-dmax-dmin$; and
   $PCM=-dmax+2MI-|dx|$, for $1-MI<-dmax-dmin$;
   wherein PCM is the non-zero offset value, dmin is the minimum value of the first duty cycles, dx is the scaling factor, MI is the modulation index, and dmax is the maximum value of the first duty cycles.

10. The power conversion system of claim 1, wherein the controller is configured to compute the non-zero offset value according to:
    the modulation index,
    a maximum or minimum value of the first duty cycles, and
    a scaling factor that is a function of the modulation index and a frequency of a voltage or current of the AC connection.

11. The power conversion system of claim 10, further comprising a look up table, including a plurality of scaling factor values indexed according to values of the modulation index and the frequency of the voltage or current of the AC connection.

12. The power conversion system of claim 10, wherein the controller is configured to compute the non-zero offset value as:
    $PCM=-dmin-|dx|$, for $1-MI<-dmax-dmin$; and
    $PCM=-dmax+2MI-|dx|$, for $1-MI<-dmax-dmin$;
    wherein PCM is the non-zero offset value, dmin is the minimum value of the first duty cycles, dx is the scaling factor, MI is the modulation index, and dmax is the maximum value of the first duty cycles.

13. The power conversion system of claim 1, wherein the AC connection is an AC output of a multiphase inverter, and wherein the DC connection is a DC input of the multiphase inverter.

14. The power conversion system of claim 1, wherein the AC connection is an AC input of a rectifier, and wherein the DC connection is a DC output of the rectifier.

15. A method, comprising:
    computing a plurality of first duty cycles according to a modulation index for a current switching control cycle of a power conversion system, each first duty cycle corresponding to a respective one of a plurality of AC nodes of the power conversion system;
    in response to the modulation index being less than or equal to a non-zero threshold, generating a plurality of switching control signals according to the first duty cycles for the current switching control cycle;

in response to the modulation index exceeding the non-zero threshold, computing a plurality of second duty cycles by adding a non-zero offset value to the first duty cycles, each second duty cycle corresponding to a respective one of the plurality of AC nodes; and in response to the modulation index exceeding the non-zero threshold, generating the plurality of switching control signals according to the second duty cycles for the current switching control cycle.

16. The method of claim 15, further comprising: computing the non-zero offset value according to the modulation index, and a maximum or minimum value of the first duty cycles.

17. The method of claim 15, further comprising:
computing the non-zero offset value according to:
  the modulation index,
  a maximum or minimum value of the first duty cycles, and
  a scaling factor that is a function of the modulation index and a frequency of a voltage or current of an AC connection of the power conversion system.

18. The method of claim 17, further comprising:
computing the non-zero offset value as:
PCM=−dmin−|dx|, for 1−MI<−dmax−dmin; and
PCM=−dmax+2MI−|dx|, for 1−MI<−dmax−dmin;
wherein PCM is the non-zero offset value, dmin is the minimum value of the first duty cycles, dx is the scaling factor, MI is the modulation index, and dmax is the maximum value of the first duty cycles.

19. A non-transitory computer readable medium with program instructions which, when executed by a processor cause the processor to:

compute a plurality of first duty cycles according to a modulation index for a current switching control cycle of a power conversion system, each first duty cycle corresponding to a respective one of a plurality of AC nodes of the power conversion system;

in response to the modulation index being less than or equal to a non-zero threshold, generate a plurality of switching control signals according to the first duty cycles for the current switching control cycle;

in response to the modulation index exceeding the non-zero threshold, compute a plurality of second duty cycles by adding a non-zero offset value to the first duty cycles, each second duty cycle corresponding to a respective one of the plurality of AC nodes; and in response to the modulation index exceeding the non-zero threshold, generate the plurality of switching control signals according to the second duty cycles for the current switching control cycle.

20. The non-transitory computer readable medium of claim 19, with further program instructions which, when executed by the processor cause the processor to:

compute the non-zero offset value according to the modulation index, and a maximum or minimum value of the first duty cycles.

* * * * *